United States Patent [19]

Lummis

[11] 4,438,582
[45] Mar. 27, 1984

[54] DOWNRIGGER SYSTEM MOUNTING ARRANGEMENT

[75] Inventor: Michael G. Lummis, Portage, Mich.

[73] Assignee: Pacific Atlantic Products, Ltd., Kalamazoo, Mich.

[21] Appl. No.: 344,212

[22] Filed: Jan. 29, 1982

[51] Int. Cl.³ .............................................. A01K 89/00
[52] U.S. Cl. ..................................... 43/27.4; 248/538
[58] Field of Search ........................... 43/4, 27.4, 21.2; 248/538

[56] References Cited

U.S. PATENT DOCUMENTS

| | | | |
|---|---|---|---|
| 2,981,509 | 4/1961 | Messenger | 43/21.2 |
| 3,568,352 | 3/1971 | Hill | 43/21.2 |
| 3,614,016 | 10/1971 | Rieth | 43/27.4 |
| 3,961,438 | 6/1976 | Henze | 43/27.4 |
| 4,004,366 | 1/1977 | Berry | 43/27.4 |
| 4,014,127 | 3/1977 | Turner | 43/24 |
| 4,124,190 | 11/1978 | Wheeler | 248/538 |
| 4,156,320 | 5/1979 | Kammeraad | 43/27.4 |

*Primary Examiner*—Gene P. Crosby
*Attorney, Agent, or Firm*—Dressler, Goldsmith, Shore, Sutker & Milnamow, Ltd.

[57] ABSTRACT

A downrigger fishing system is disclosed which includes a pair of coacting mounting arrangements. This system includes a frame assembly which rotatably supports a downrigger line reel, and a downrigger arm attached to the frame assembly for guiding the downrigger line. Not only may the downrigger system be mounted in a conventional fashion to a suitable downrigger mounting plate, but the system further includes an additional mounting arrangement so that the assembly may be readily and releasably secured to the oarlock of a rowboat or similar small craft. In this way, the downrigger system may be conveniently used for trolling in relatively shallow water or other places where relatively small craft are best suited.

8 Claims, 5 Drawing Figures

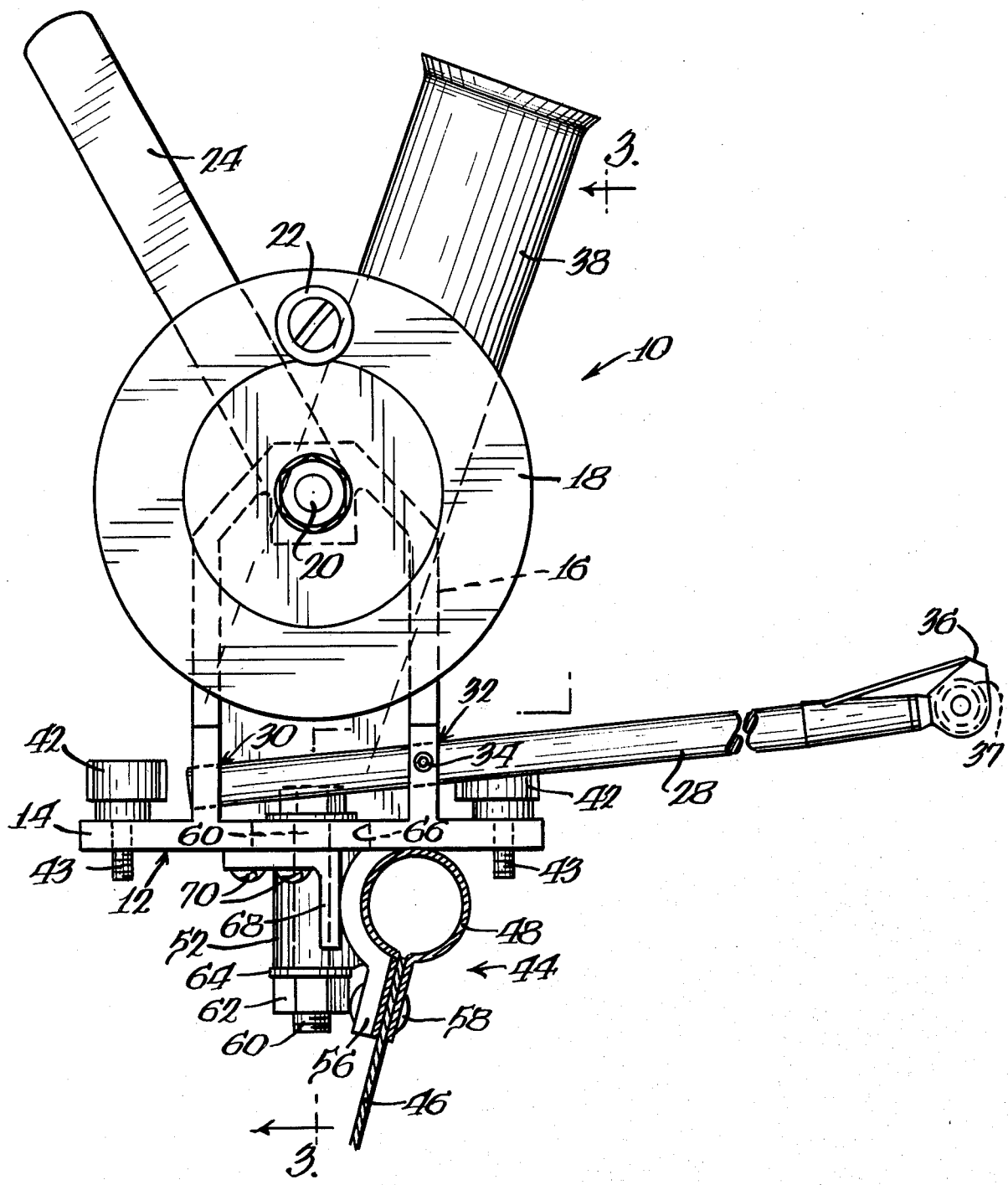

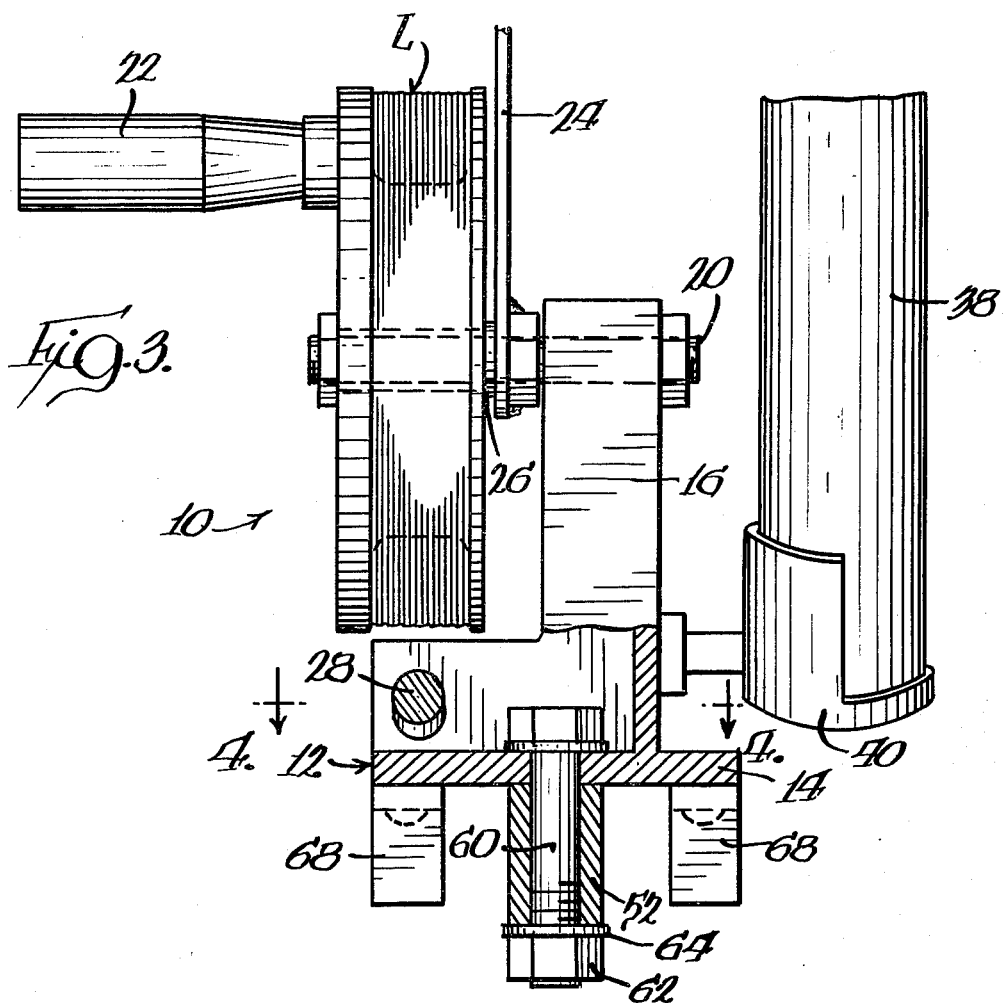
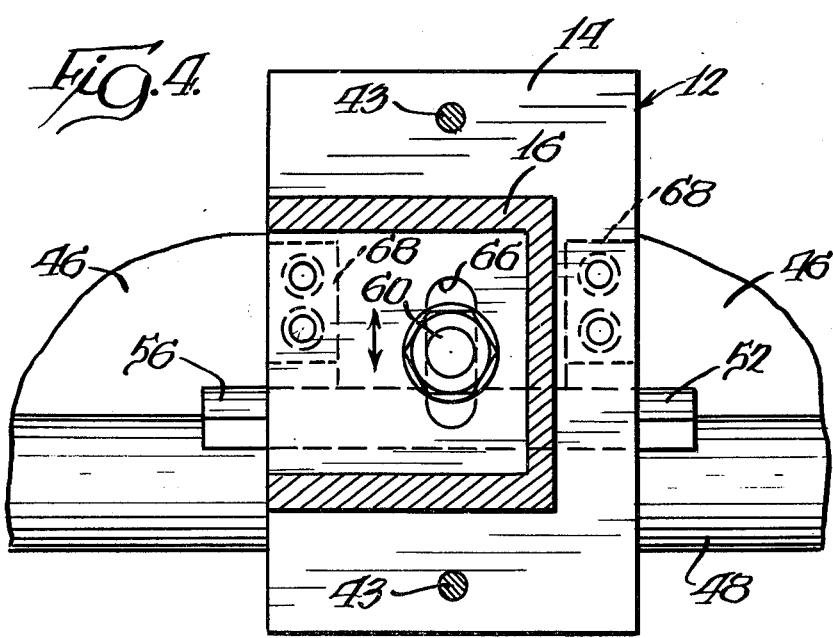

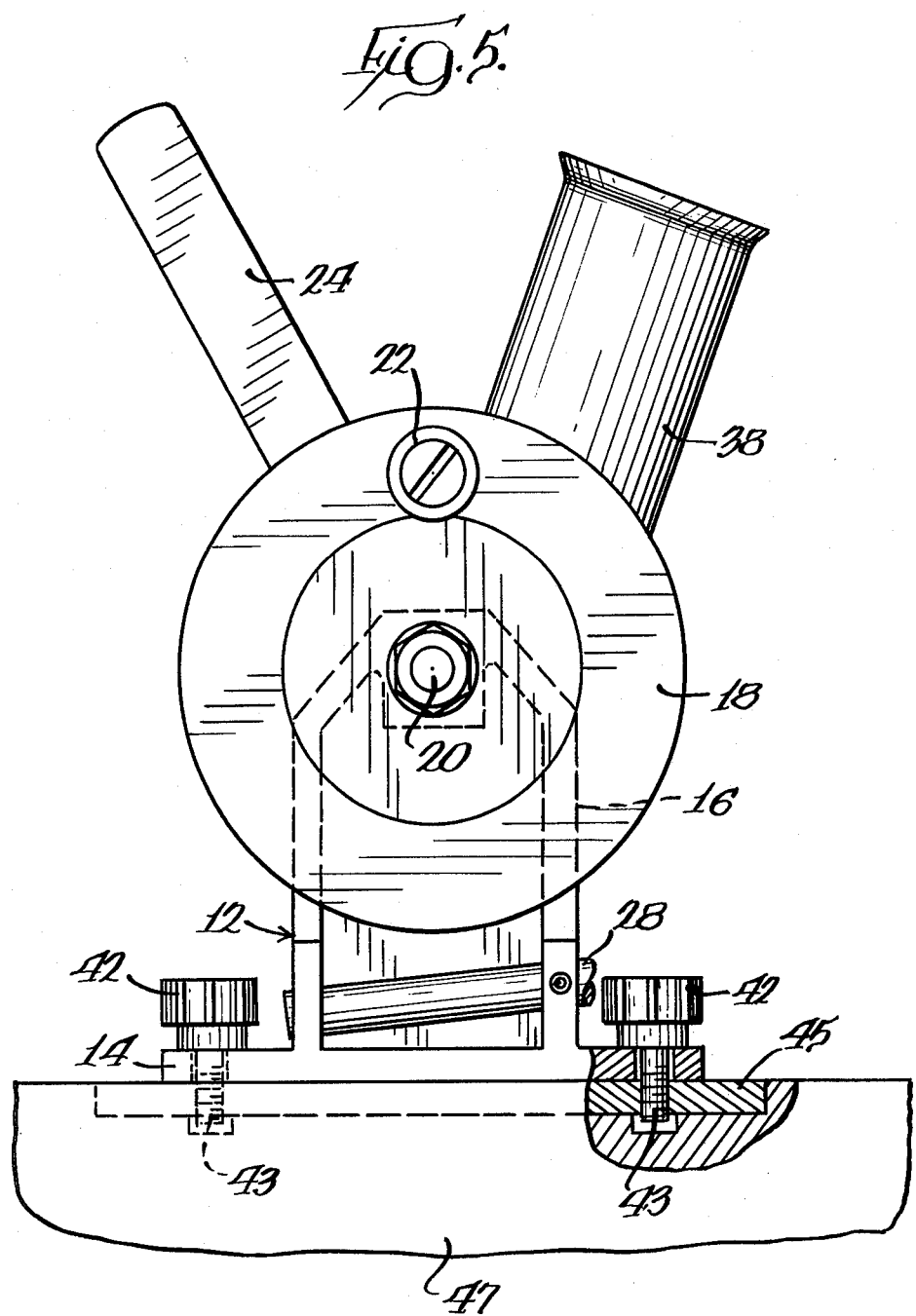

DOWNRIGGER SYSTEM MOUNTING ARRANGEMENT

TECHNICAL FIELD

The present invention relates generally to downrigger fishing arrangements for trolling, and more particularly to a downrigger system having an improved arrangement for mounting the system on a boat.

BACKGROUND OF THE INVENTION

Downriggers are widely used for trolling during deep-water sport fishing. A downrigger system typically includes a frame which rotatably supports a reel which stores and dispenses downrigger line. A downrigger arm extends from the frame and includes a guide arrangement at its free end for guiding line from the downrigger reel into and out of the water.

The downrigger is used by attaching fishing line from a fishing rod and reel to an automatic release attached to the downrigger line. The downrigger line and release are lowered into the water so that the fishing line and its bait or lure are carried down to the desired depth by the weighted downrigger line. The boat upon which the downrigger system is mounted is then moved through the water at trolling speeds so that the fishing line and lure trail behind the boat in the desired manner. When a fish strikes the lure, the fishing line is automatically released from the downrigger line, and the fisherman then exercises his skills with the fishing rod in order to boat the catch.

Downrigger systems are frequently used for trolling in relatively deep water. For deep-water trolling, the downrigger system is typically mounted on a suitable boat by means of a downrigger mounting plate securely attached to the gunnel of the boat.

Typical downrigger systems usually include an arrangement for releasably attaching the system to the mounting plate affixed to the boat to secure the downrigger system in place. Without such a mounting plate firmly affixed to the gunnel of the boat, the typical downrigger system cannot be conveniently mounted for use. Naturally, this detracts from the suitability of the downrigger system for ready munting on different craft not having the usual mounting plate. Additionally, small craft which are suited for operation in relatively shallow water, such as rowboats and the like, may need to be specially adapted for mounting a downrigger system thereon, since these boats may not be configured so as to provide a convenient mounting location for a conventional downrigger mounting plate.

Thus, a downrigger system which includes mounting arrangements for mounting the system on a small boat as well as on a larger craft provides enhanced versatility for use of the system.

SUMMARY OF THE INVENTION

In accordance with the present invention, an improved downrigger system is disclosed which is particularly suited for releasably mounting in the oarlock of a rowboat or similarly equipped small craft, and which may also be releasably mounted to a downrigger mounting plate. This permits ready use of the downrigger system for trolling in relatively shallow water from small boats, while the system may still be used for deep water trolling from a boat equipped with a suitable downrigger mounting plate.

The downrigger system includes a frame assembly which supports a reel rotatably mounted thereon. The reel is provided for storing and dispensing downrigger line which is carried down into the water by a relatively heavy sinker. A reel brake is provided which is operatively associated with the reel for selectively preventing rotation of the reel. An elongated downrigger arm having one end supported by the frame assembly extends outwardly of the frame for guiding the downrigger line from the reel into and out of the water.

A first mounting arrangement is provided which cooperates with the frame assembly for releasably attaching the system to a downrigger mounting plate, which is usually affixed in a permanent fashion to the gunnel of a relatively large craft. This mounting arrangement preferably includes a pair of plate mounts carried by the base portion of the frame assembly and adapted to bear against the generally peripheral portion of the frame assembly, each plate mount having a threaded shank portion adapted to mesh with a suitable threaded opening in the downrigger mounting plate.

A second mounting arrangement utilizing the same base portion of the frame assembly is provided for releasably attaching the frame assembly to the oarlock of a rowboat or similar small craft. The second mounting arrangement includes a removable fastener assembly preferably including an elongated mechanical fastener such as a threaded bolt, which extends through the aforesaid common base portion and is adapted to bear against the frame assembly of the downrigger and which also extends through the oarlock for securing the downrigger system to the boat. Preferably, an elongated opening is provided in the frame assembly through which the fastener assembly extends so that the downrigger system may be adjustably mounted to the boat and firmly secured thereto.

In the preferred embodiment of the second mounting arrangement, this arrangement includes a pair of spaced, removable brackets releasably connected to and projecting downwardly from the frame assembly. Each bracket is disposed on a respective side of the opening in the frame assembly and is adapted to firmly engage an upper edge portion of the row boat. In this way, the brackets cooperate with the fastener assembly to stabilize and firmly affix the downrigger system to the oarlock of the boat.

When the downrigger system has been mounted to the oarlock of a small boat in this fashion, the system is ready for use, with the relatively small nature of the craft accommodating trolling in shallow water. When shallow water trolling is completed, the fastener assembly of the second mounting arrangement may be easily detached, and the downrigger system quickly and easily removed for storage.

Numerous other advantages and features of the present invention will become readily apparent from the following detailed description of the invention and an embodiment thereof, from the claims, and from the accompanying drawings in which like numerals are employed to designate like parts throughout the same.

BRIEF DESCRIPTION OF THE DRAWINGS

FIG. 2 is a side elevational view of the downrigger system illustrated in FIG. 1, as assembled, and is shown mounted on the oarlock of a boat;

FIG. 3 is a view partially in section taken along plane 3—3 of FIG. 2;

FIG. 4 is a view partially in section taken along plane 4—4 of FIG. 3; and

FIG. 5 is a side elevational view illustrating the downrigger system of FIG. 1 mounted on a downrigger mounting plate.

DETAILED DESCRIPTION

Figure 1:
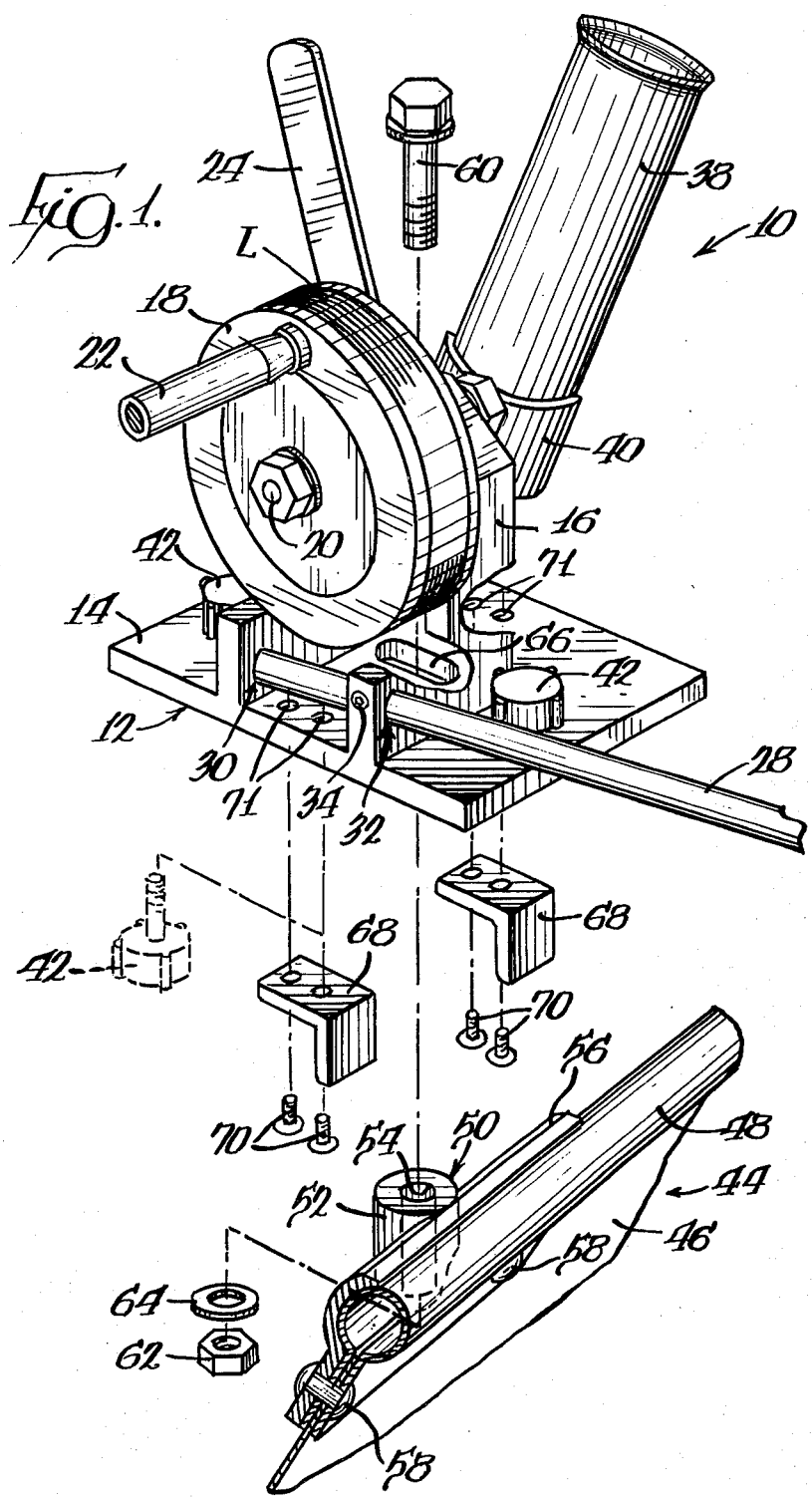
FIG. 1 is a partially exploded perspective view of a downrigger system embodying the present invention and illustrating the mounting of the system on an oarlock of a boat.

While the present invention is susceptible to embodiment in various forms, there is shown in the drawings and will hereinafter be described a presently preferred embodiment with the understanding that the present disclosure is to be considered as an exemplification of the invention and is not intended to limit the invention to the specific embodiment illustrated.

With reference to the drawings, FIG. 1 illustrates downrigger system 10 of the present invention. The downrigger system includes a frame assembly 12 comprising a frame base portion 14 and a reel support portion 16 extending upwardly therefrom. A reel 18, which stores and dispenses downrigger line L, is rotatably supported by the reel support portion 16 on reel shaft 20. Reel handle 22 permits manual rotation of reel 18 for dispensing and reeling in the downrigger line. A reel brake 24 is operatively associated with reel 18 by a brake washer 26 so that rotation of reel 18 may be selectively prevented, and thus the length of dispensed downrigger line L maintained as desired.

So that downrigger line L may be lowered into the water at a point spaced horizontally from reel 18, downrigger system 10 includes an elongated downrigger arm 28 for guiding line L into the water. Downrigger arm 28, typically approximately four feet in length, is firmly supported by the reel support portion 16 of frame assembly 12 at arm supports 30 and 32. A set screw 34 at arm support 32 fixes arm 28 firmly in position, but permits the arm to be removed from the frame assembly when desired, such as for storage or transport of the system. Downrigger arm 28 includes line guide 36 (FIG. 2) at its free end portion, the line guide including a pulley 37 for smoothly guiding the downrigger line into the water.

As discussed, trolling with a downrigger system is accomplished by using the system in conjunction with a fishing rod and reel. To this end, downrigger system 10 includes a rod holder 38 mounted on frame assembly 12 by a holder support 40. The fishing rod and reel may be conveniently supported by the rod holder, and the fishing line releasably connected with the downrigger line L by a suitable automatic release mechanism, such mechanisms being well known in the art. Commonly assigned U.S. Pat. No. 3,925,920 illustrates one such automatic release mechanism which has proven to provide the desired release action in a reliable and adjustable fashion. After a fish takes the bait or lure on the fishing line, the fishing line is automatically detached from the downrigger line, and the rod and reel may then be removed from rod holder 38 to boat the fish.

As shown, downrigger system 10 includes a first mounting arrangement which preferably comprises a pair of downrigger plate mounts 42 which cooperate with and extend through opposite ends of base portion 14 of the frame assembly 12. Each plate mount 42 comprises a threaded shank portion 43 which may be rotated by a hand knob assembly at the upper end thereof. As shown in FIG. 5, plate mounts 42 are adapted for use in conjunction with a suitable downrigger mounting plate 45 affixed in a permanent manner to the gunnel 47 of a boat. Attaching downrigger system 10 to a boat with the use of plate mounts 42 requires that the plate mounts securely engage and cooperate with the suitably threaded downrigger mounting plate 45 affixed to the boat so that the mounts firmly bear against the upper peripheral surface of base portion 14. Even though plate mounts 42 provide ready mounting and detachment of the downrigger system, use of plate mounts 42 requires that mounting plate 45 be firmly affixed to the fishing boat.

In accordance with the present invention, downrigger system 10 includes an additional, second mounting arrangement for frame assembly 12 so that the system may be readily removably mounted upon an oarlock of a boat not equipped with the usual downrigger mounting plate.

As shown in FIG. 1, a portion of a typical small craft or boat 44, such as a rowboat or the like, is illustrated as including a side wall 46 which terminates at an upper tubular gunnel portion 48. Boat 44 includes an oarlock 50 which is typically provided for supporting an oar assembly for rowing the boat. Oarlock 50 includes a cylindrical portion 52 having a generally cylindrical bore 54 therein, and a mounting plate 56 to which a cylindrical portion 52 is firmly affixed. Oarlock 50 is mounted to boat 44 by a plurality of mechanical fasteners 58 which extend through mounting plate 56 and side wall 46.

Mounting of downrigger system 10 to oarlock 50 is provided by a removable fastener assembly which extends through a central region of base portion 14 of frame assembly 12 and through cylindrical portion 52 of the oarlock. The fastener assembly preferably includes an elongated threaded bolt 60, and a threaded nut 62 and lock washer 64 which may be threaded on and retained by the bolt 60. An opening 66 is defined by base portion 14 of frame assembly 12. A centrally disposed bearing surface is provided about the opening 66 against which bolt 60 abuts and engages for mounting the system while the underside of base portion 14 abuts the gunnel portion 48. Opening 66 is preferably elongated to provide a slot to accommodate adjustable mounting of downrigger system 10, as will be described.

This second mounting arrangement of the downrigger system, utilizing the same base portion 14 as the first mounting arrangement, preferably further includes at least one bracket projecting downwardly from frame assembly 12. In the preferred embodiment, a pair of removable mount brackets 68 project downwardly from base portion 14 of frame assembly 12. Each mount bracket 68 is preferably generally L-shaped, and is suitably releasably affixed to frame assembly 12 by mechanical fasteners 70 threadedly received in apertures 71. Mount brackets 68 are preferably disposed on respective opposite sides of opening 66. The brackets cooperate with the fastener assembly, including bolt and nut 60 and 62, and the base portion 14 of the frame assembly to provide stability for downrigger system 10 after it is mounted on oarlock 50 as follows. In lieu of separate mount brackets 68, the plate mounts 42 can be threadedly received within apertures 71 to perform the same function as the brackets 68, as illustrated in phantom line in FIG. 1. It will be appreciated that to utilize plate mounts 42 in this manner provides the desired stability for the system when mounted on the oarlock. Additionally, enhanced engagement and line contact is provided between plate mounts 42 and the gunnel portion of boat 44 when the hand knob of each mount 42 is generally circular, and the gunnel portion of boat 44 is curved from fore to aft.

Frame assembly 12 of the downrigger system is positioned adjacent gunnel 48 of boat 44, as best illustrated in FIG. 2. Opening 66 defined by the frame assembly is aligned with bore 54 defined by cylindrical portion 52 of the oarlock. The fastener assembly may then be used for securing the downrigger system to the oarlock by insertion of bolt 60 through opening 66 and bore 54 in the oarlock 50. Bolt 60 is preferably dimensioned such that a threaded portion of its shank extends below the cylindrical portion 52 of the oarlock. Lock washer 64 and threaded nut 62 are then attached to bolt 60, and the fastener assembly is tightened. Before the fastener assembly is fully tightened, the preferably elongated nature of opening 66 permits some relative movement of frame assembly 12 with respect to oarlock 50. This accommodates mounting of the downrigger system on oarlocks varying in dimension.

Frame assembly 12 is positioned such that each of mount brackets 68 firmly engage the upper edge portion of the boat. As illustrated in FIG. 2, bracket 68 engages a portion of oarlock mounting plate 56, although it will be appreciated that mount brackets 68 are adapted to engage the sidewall or gunnel portion of boat 44, or a portion of the oarlock, depending upon the exact configuration of the oarlock and boat.

With the downrigger system 10 positioned generally as shown in FIG. 2, bolt 60 and nut 62 of the fastener assembly may be firmly tightened so that the entire downrigger system is securely attached to oarlock 50. Lock washer 64 prevents unintended loosening of the fastener assembly, while mount brackets 68 cooperate with the fastener assembly to stabilize the system.

The downrigger system is now ready for use, and a fisherman may place his rod and reel in rod holder 38, and connect the fishing line to downrigger line L. The downrigger line and fishing line are then lowered into the water, and trolling of the boat commenced. Since the present downrigger system is adapted for mounting on a relatively small craft, the system is particularly well suited for shallow water trolling.

When fishing is completed, the entire downrigger system may be easily removed from oarlock 50 by merely detaching bolt 60 and nut 62 of the fastener assembly. Because the entire fastener assembly and mount brackets 68 may be removed from frame 12 when the downrigger system is not mounted in an oarlock, the suitability of the downrigger system for mounting on a downrigger mounting plate is not impaired. Thus, the present downrigger system is suitable for use in both a conventional fashion secured to a typical downrigger mounting plate, or may be readily affixed in the oarlock of a suitable small craft for shallow water trolling, or fishing in other areas best suited for use of small craft.

The foregoing is intended as illustrative but not limiting. Variations and modifications may be effected without departing from the true spirit and scope of the present invention. No limitations with respect to the specific apparatus illustrated herein is intended or should be inferred. It is, of course, intended to cover by the appended claims all such modifications as fall within the scope of the claims.

What is claimed is:

1. A downrigger system for trolling adapted to be mounted on a boat, comprising:
   a frame assembly having a base portion,
   a reel rotatably mounted on said frame assembly for dispensing a downrigger line,
   first mounting means on the base portion adapted to cooperate with said frame assembly for use in releasably attaching said system to a mounting plate affixed to said boat, and
   second mounting means on the same base portion adapted to cooperate with said frame assembly for use in releasably attaching said system to an oarlock affixed to said boat,
   said second mounting means comprising fastener means adapted to extend through the base portion of said frame assembly and said oarlock for attaching the downrigger system to said boat,
   said frame assembly defining an elongated opening through which said fastener means extends for accommodating adjustable mounting of said downrigger system.

2. A downrigger system for trolling adapted to be mounted on a boat, comprising:
   a frame assembly having a base portion, a reel rotatably mounted on said frame assembly for dispensing a downrigger line,
   first mounting means on the base portion adapted to cooperate with said frame assembly for use in releasably attaching said system to a mounting plate affixed to said boat, and
   second mounting means on the same base portion adapted to cooperate with said frame assembly for use in releasably attaching said system to an oarlock affixed to said boat,
   said second mounting means comprising fastener means adapted to extend through the base portion of said frame assembly and said oarlock for attaching the downrigger system to said boat,
   said second mounting means further comprising removable bracket means releasably connected to said frame assembly and adapted to engage said boat when said downrigger system is attached to said oarlock for stabilizing the system.

3. The downrigger system of claim 2, wherein said bracket means comprises a pair of spaced brackets projecting downwardly of said frame assembly and adapted to engage a gunnel portion of said boat.

4. The downrigger system of claim 1, wherein said first mounting means comprise at least one plate mount adapted to extend through the base portion and bear against a portion of said frame assembly, said plate mount being threadably engagable with said mounting plate.

5. A downrigger system for trolling adapted for mounting on a boat, comprising:
   a downrigger frame assembly defining an opening and a bearing surface,
   a reel rotatably mounted on said frame assembly for dispensing and storing a downrigger line,
   an elongated downrigger arm having one end supported by said frame assembly and extending outwardly of said boat from said frame assembly for guiding the line from said reel, and
   mounting means adapted for use in releasably mounting said system on an oarlock affixed to said boat, including removable fastener means adapted to extend through said opening in said frame assembly and the oarlock, and bear against said bearing surface for releasably mounting the system on the oarlock, said opening through which said fastener means is adapted to extend having an elongated configuration for accommodating adjustable mounting of said downrigger system, said mounting means further including bracket means comprising a pair of spaced mount brackets connected to and extending downwardly of said frame assembly on respective opposite sides of said opening, said brackets being adapted to engage said boat when said downrigger system is attached to said oarlock.

6. A downrigger system for trolling adapted for mounting on a boat, comprising:

a downrigger frame assembly defining an opening and a bearing surface, a reel rotatably mounted on said frame assembly for dispensing and storing a downrigger line, an elongated downrigger arm having one end supported by said frame assembly and extending outwardly of said boat from said frame assembly for guiding a line from said reel, and mounting means adapted for use in releasably mounting said system on an oarlock affixed to said boat, including removable fastener means adapted to extend through said opening in said frame assembly and the oarlock, and bear against said bearing surface for releasably mounting the system on the oarlock, said mounting means including removable bracket means releasably connected to and extending downwardly of said frame assembly, said bracket means adapted to engage a portion of said boat when said system is mounted on said oarlock for stabilizing said system.

7. The downrigger system of claim 6, and plate mount means adapted to cooperate with and bear against said frame assembly and releasably threadably engage a mounting plate affixed to said boat when said downrigger system is mounted on said boat with said plate mount means.

8. The downrigger system of claim 6, wherein said bracket means are replaceable by said mount means which can be releasably threadably received by said frame assembly so that said plate mount means are adapted to engage a portion of said boat when said system is mounted on said oarlock, said plate mount means being further adapted to cooperate with and bear against said frame assembly and releasably threadably engage a mounting plate affixed to said boat when said downrigger system is mounted on said boat with said plate mount means.

* * * * *

UNITED STATES PATENT AND TRADEMARK OFFICE
CERTIFICATE OF CORRECTION

PATENT NO. : 4,438,582

DATED : March 27, 1984

INVENTOR(S) : Michael G. Lummis

It is certified that error appears in the above-identified patent and that said Letters Patent is hereby corrected as shown below:

In column 8, line 18, delete "said" and insert --plate-- therefor.

Signed and Sealed this

Twelfth Day of March 1985

[SEAL]

Attest:

DONALD J. QUIGG

Attesting Officer     Acting Commissioner of Patents and Trademarks